T. VAN EVERDINGEN.
MUSTARD VESSEL.
APPLICATION FILED OCT. 7, 1912.

1,117,281.

Patented Nov. 17, 1914.

Witnesses:
Albert Hamilton
M. Hamilton

Inventor:
Theodorus van Everdingen
by his attorney
James Hamilton

UNITED STATES PATENT OFFICE.

THEODORUS VAN EVERDINGEN, OF THE HAGUE, NETHERLANDS.

MUSTARD VESSEL.

1,117,281.      Specification of Letters Patent.      Patented Nov. 17, 1914.

Application filed October 7, 1912. Serial No. 724,480.

*To all whom it may concern:*

Be it known that I, THEODORUS VAN EVERDINGEN, purser of the steamship *Hollandia*, subject of the Queen of the Netherlands, residing at The Hague, Netherlands, have invented certain new and useful Improvements in Mustard Vessels, of which the following is a full, clear, and exact description.

My invention relates to improvements in receptacles and particularly to improvements in receptacles for preserving and distributing mustard and like material liable to dry and harden; and an object of this invention is to provide a receptacle of the character just described which will withdraw the mustard (or other material) left in the mouth or nozzle formed in the cover and thereby prevent the stoppage of the outlet, which would otherwise occur by reason of the drying therein of the mustard (or other like material).

A characteristic feature of this invention resides in the provision of a two-part piston, the parts of which are separated from each other when the piston is moved toward the cover for the purpose of forcing through the outlet a portion of the contents of the vessel and which approach or close toward each other when the forcing movement of the piston ceases. The closing of the parts of the piston together causes a sucking action whereby the mustard left in the outlet opening is withdrawn within the receptacle, thus freeing the outlet and preventing stoppage thereof by reason of the drying of the mustard therein.

Figure 1:
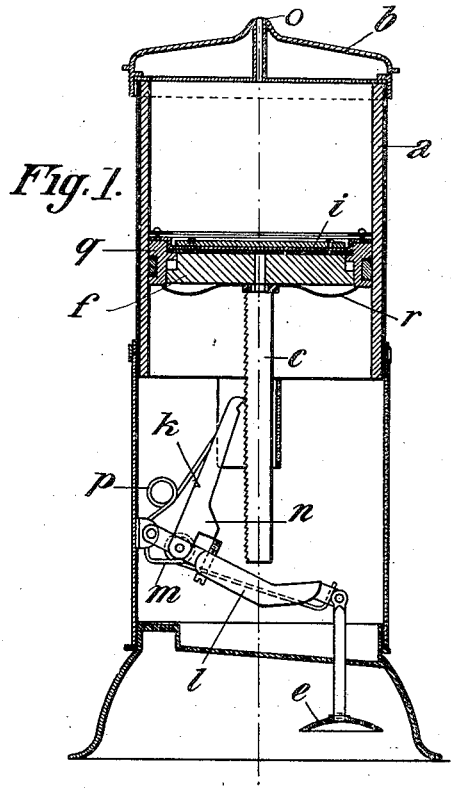
Figure 2:
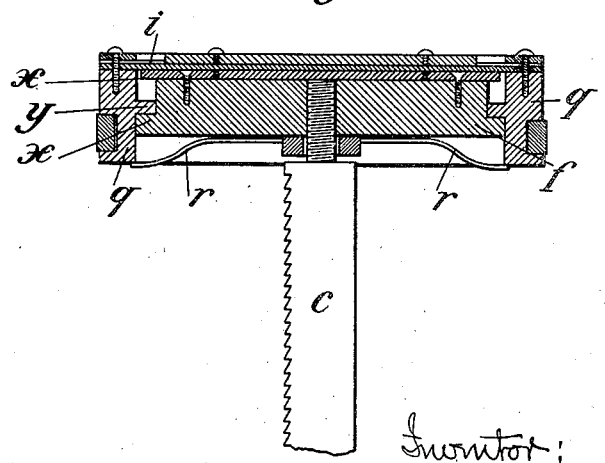

In the drawings illustrating the principle of this invention and the best mode now known to me of applying that principle, Figure 1 is a vertical central section through the vessel; and Fig. 2 is a detail view showing the piston in vertical central section on an enlarged scale.

The receptacle $a$ is provided with a cover $b$ formed with an outlet opening $o$. In the receptacle $a$ there is mounted a piston $f$ from which depends a toothed rack $c$ with which is adapted to engage the toe-end or free end of a pawl $k$ pivotally fastened to the lever $l$ fulcrumed within the receptacle and actuated by means of a headed rod $e$ the head of which is accessible from without the vessel $a$. The rod $e$ is projected downwardly through the bottom of the vessel and by means of a spring $m$ is constantly pressed outward.

The lever $k$ by means of a spring $p$ is normally held in engagement with the teeth of the rod $c$, and is provided with a nose $n$, pressed by the lever $l$ when the piston $f$ has delivered or pressed out a sufficient quantity of mustard. This purpose attained, the lever $k$ will be lifted and automatically released from the toothed rod $c$. The piston consists of two parts; the one $f$ of which forms practically the true piston, carrying the governing rod $c$, while the other one $q$, having the shape of a ring surrounds the first one, and may slide on the side wall of the receptacle $a$. Both parts of the piston are axially movable toward each other, a certain space being left between their shoulders $x$ and $y$. By the spring $r$ both parts are held down in the position shown in Fig. 1, in which the lower part of the piston occupies its lowest position. The whole piston is covered by a guard plate $i$ of rubber or any other suitable material, in order to prevent the penetration of the mustard between the two parts of the same.

It results from the foregoing that, by pressing upon the button $e$ for the purpose of causing the mustard to leave the vessel, the part $f$ of the piston is first raised or lifted, whereupon the part $q$ of same will be brought into the position shown in Fig. 2. By a further pressure exercised on the button $e$, also the part $q$ is raised or lifted, until the pawl $k$ is released from its engagement with the toothed rod. When no pressure is exercised upon the toothed rod $c$ or if the pressure ceases, the part $f$, by means of the spring $r$ is drawn downward, while the part $q$ invariably remains in its position (Fig. 1).

By the small back or downward movement of the part $f$ of the piston, a suction is produced in the vessel, whereby the mustard which remained in the outlet opening $o$, is sucked back into the vessel.

Claims:

1. A vessel of the character described, said vessel having a two-part piston; means operable from without the vessel for moving one of the parts of said piston relatively to the other; and an automatic device for moving the parts of said piston relatively to each other, when said means are out of operation.

2. A vessel of the character described, said vessel having a two-part piston one of the parts of which is surrounded by the other thereof and is formed with guide-members; an automatic device which holds said parts separated from each other; and means operable from without the vessel for closing said parts toward each other and moving the piston as a whole to force the contents of the vessel from the same.

THEODORUS van EVERDINGEN.

Witnesses:
D. P. De Young,
P. Hildering.